United States Patent [19]

O'Neill et al.

[11] Patent Number: 5,073,272
[45] Date of Patent: Dec. 17, 1991

[54] METHOD FOR USING A FLOCCULANT POWDER

[75] Inventors: Gary A. O'Neill, Lowell, Mass.; John W. Novak, Jr., Murrysville, both of Pa.

[73] Assignee: Aluminum Company of America, Pittsburgh, Pa.

[21] Appl. No.: 486,486

[22] Filed: Feb. 28, 1990

Related U.S. Application Data

[63] Continuation-in-part of Ser. No. 271,536, Nov. 15, 1988, abandoned.

[51] Int. Cl.⁵ .............................................. C02F 1/56
[52] U.S. Cl. ................................. 210/728; 210/732; 210/733; 210/734; 210/735; 210/908
[58] Field of Search ............ 210/666, 679, 714, 725, 210/727, 728, 732–736, 907, 908

[56] References Cited

U.S. PATENT DOCUMENTS

| | | | |
|---|---|---|---|
| 3,300,406 | 1/1967 | Pollio | 210/666 |
| 3,352,424 | 11/1967 | Guebert et al. | 210/509 |
| 3,488,718 | 1/1970 | Innes et al. | 210/54 |
| 3,516,932 | 6/1970 | Hedrick et al. | 210/53 |
| 3,707,523 | 12/1972 | Ledden et al. | 210/907 |
| 3,948,784 | 4/1976 | Krillic et al. | 252/26 |
| 4,043,910 | 8/1977 | Field et al. | 210/53 |
| 4,076,615 | 2/1978 | Olesen et al. | 210/5 |
| 4,177,142 | 12/1979 | Halbfoster | 210/75 |
| 4,238,334 | 12/1980 | Halbfoster | 210/679 |
| 4,275,043 | 6/1981 | Gnyra | 423/130 |
| 4,279,756 | 7/1981 | Weiss et al. | 210/667 |
| 4,363,749 | 12/1982 | Weiss et al. | 252/455 R |
| 4,425,238 | 1/1984 | Degen et al. | 210/666 |
| 4,549,966 | 10/1985 | Beall | 210/661 |
| 4,668,404 | 5/1987 | Walterick | 210/917 |

FOREIGN PATENT DOCUMENTS

| | | |
|---|---|---|
| 1169735 | 6/1984 | Canada . |
| 2655356 | 6/1978 | Fed. Rep. of Germany . |
| 3438140 | 4/1986 | Fed. Rep. of Germany . |
| 7600152 | 1/1976 | South Africa . |
| 1466185 | 3/1977 | United Kingdom ................ 210/734 |
| 1512481 | 6/1978 | United Kingdom . |
| 2092121 | 8/1982 | United Kingdom . |

*Primary Examiner*—Peter Hruskoci
*Attorney, Agent, or Firm*—Gary P. Topolosky

[57] ABSTRACT

A dry flocculant powder comprises an inorganic substrate consisting essentially of metal oxide/hydroxide particles having an average particle size of less than about 30 microns, said substrate having a cationic or anionic polyelectrolyte coated onto its outer surface, preferably under other than high shear conditions. A method for coating or adhering polyelectrolytes to the outermost surface of inorganic particles comprises dispersing a polyelectrolyte in a substantially non-aqueous solvent, preferably having a low boiling point and a low to intermediate polarity relative to the polyelectrolyte; adding the inorganic particles to the solvent to form a slurry; mixing the slurry under low to moderate shear conditions; and removing excess solvent from the slurry. There is also disclosed a method for removing clay, clay-like materials, humic acids, yeast, biological cells and/or other cell debris from an aqueous stream through contact with the aforementioned dry flocculant powder.

24 Claims, 4 Drawing Sheets

METHOD FOR USING A FLOCCULANT POWDER

This application is a continuation-in-part of U.S. application Ser. No. 271,536, filed Nov. 15, 1988 now abandoned.

BACKGROUND OF THE INVENTION

1. Field of the Invention

This invention relates to a dry flocculant powder composition and method for making the same. The invention further relates to various methods for using the aforementioned flocculant powder to remove colloidal suspensions from waste water streams through filtration, gravity settling and/or centrifugation. The invention rapidly reduces the turbidity of aqueous solutions containing clay and clay-like materials, humic acids, yeast and other biological cell debris.

One of the major problems facing municipalities and most chemical industries today is the proper disposal of waste products. Methods for purifying waste waters, particularly aqueous streams containing organic contaminants, have been the subject of much investigation. Disposal of contaminated solutions is especially problematic for those who treat municipal sewage, industrial water supplies, or discharges from mineral dressing operations, food processing plants, breweries and many other operations. Federal, state and local government regulations have made it illegal to dump certain untreated waters back into the environment.

Various methods have been proposed for removing certain contaminants from an aqueous solution. It is well known to use such water purifying materials as alum, ferric chloride, other ferric- or ferrous-salts, alone or in combination with lime, sodium aluminate, soluble starches and water soluble polymers. The foregoing materials are often limited to use in only certain pH ranges, however. They must also be applied in precise proportion to the solids content of the water being treated, thus making it more difficult to establish means for uniformly removing contaminants from an aqueous stream. When only small amounts of contaminant are present, removal problems become even more complicated.

In many chemical and industrial manufacturing processes, waste water is often recycled. Over time, these waters accumulate environmentally unsafe levels of compounds which, in most cases, are anionic and have an adverse effect on the basic manufacturing process. For example, in the manufacture of paper, compounds such as humic acids, lignin sulfonic acids, and oxidized polysaccharides accumulate in the recycled water of a paper-making machine. Other particularly troublesome contaminants include clay and clay-like materials. These and other impurities are readily found in the ores co-extracted with bauxite. During the recovery of aluminum oxide (or alumina) from bauxite through the well-known Bayer process, some of these undesirable impurities are digested or decomposed to lower molecular weight compounds which will contaminate the various liquor streams associated with the Bayer process. In still other man-made operations, especially those associated with the production of food products, waste water streams are commonly loaded with significant amounts of protein matter, yeast products, amino acids, dyestuffs and/or other biological cell debris. The concentrations of such contaminants must also be significantly reduced before these waters are considered safe for release into the environment.

Aside from man-made pollutants, natural contamination also takes its toll on existing water supplies. Turbid waters often have a haziness caused by insoluble suspended particles such as clay, silt, bacteria, viruses, and even organic debris resulting from the decay of plant life and similar materials present in natural streams or the like. Turbidity standards have been established for determining the quality of water which municipal authorities are allowed to distribute from their facilities. Turbidity measurements are typically made by determining the amount of light scattered by undesirable particulates in a given water sample.

2. Technology Review

Over the years, several different products, methods and apparatus have been developed for handling certain waste water contaminants. The following references are exemplary of this technology.

Pollio U.S. Pat. No. 3,300,406 claims a method for treating water containing an anionic material by introducing to the water, in any order, (i) an inorganic, polyvalent metal salt; (ii) a finely-divided siliceous material; and (iii) a polymeric salt having a molecular weight between 20,000–10 million including a particular carbon-atom backbone chain. The siliceous material selected for separate introduction to the water being treated is preferably water-insoluble and carries a negative electrokinetic charge.

Innes et al U.S. Pat. No. 3,488,718 claims an improved method for separating substantially pure synthetic hydrous oxides which are capable of adsorbing anionic materials from an aqueous suspension. The method comprises adding to the suspension under flocculating conditions a water-soluble polyelectrolyte having a desired formulaic structure, preferably of polycarboxyethylene linkages.

Hedrick et al U.S. Pat. No. 3,516,932 shows a method for clarifying an aqueous clay suspension, in a flocculated state, due to the presence of inorganic salts. The method comprises adding to the suspension up to about 0.1% by weight of a polyacrylamide.

In Ledden et al U.S. Pat. No. 3,707,523, there is claimed a process for making reconstituted landfill from phosphate ore water slimes. The process includes adding polyelectrolyte and sand to these slimes for rapid solidification purposes. Because of susceptibility to damage by agitation, "however, these flocculants are added to the wet sand as a 0.1–0.5% aqueous solution."

Krillic et al U.S. Pat. No. 3,948,784 claims a method for treating an aqueous solution of water-soluble lubricants, said solution including suspended particles of metals, metal oxides, silica and/or carbon. The method comprises adding at least 0.5 ppm by weight of a cationic polyelectrolyte to the solution; dispersing the polyelectrolyte in said solution; and allowing it to stand for at least two minutes before separating lubricant from the settled particles.

Field et al U.S. Pat. No. 4,043,910 shows a method for removing phosphates from raw sewage, sewage sedimentation effluent, or food processing effluent containing said phosphates. The process comprises the steps of first precipitating soluble phosphates from the solution through contact with an inorganic coagulant containing aluminum, ferrous, ferric or calcium ions. About 15 seconds to 4 minutes later, a sufficient amount of cationic polyelectrolyte (as formulaically defined therein) is added to the solution before a liquid-solids separation process is practiced.

Olesen et al U.S. Pat. No. 4,076,615 claims an improved process for removing dissolved organic pollutants from waste water. The process includes contacting the water with an oxygen-containing gas and an acidified slurry of activated carbon and alum. The pH of this solution is then adjusted to cause aluminum hydroxide to precipitate before adding a polyelectrolyte flocculant to the water.

Halbfoster U.S. Pat. Nos. 4,177,142 and 4,238,334 show a method and filter bed for removing impurities from a liquid. The bed comprises: (a) a preferably fibrous filter aid material which has been treated with an electrolyte-type compound for producing a surface charge opposite the filter material's normal charge; and (b) an active particulate material having an opposite surface charge from that of the treated filter aid material in aqueous suspension. The particulate material ultimately added to treated filter aid material may be selected from the group consisting of organic polymeric absorbents, zeolites, bentonite, zirconium oxide, zirconium phosphate, activated alumina, ferrous sulfide, activated carbon and diatomaceous earth.

In Gnyra U.S. Pat. No. 4,275,043, there is claimed a method for controlling the level of sodium oxalate in a Bayer liquor stream, said stream containing in excess of 1 g/L of humic matter. The method includes treating the liquor stream with no more than 0.5 g/L of an adsorbent selected from activated carbon, activated alumina or activated clay.

Weiss et al U.S. Pat. Nos. 4,279,756 and 4,363,749 show a coagulant/adsorbent and method for removing suspended impurities from water through coagulation. The preferred adsorbent for this method consists of mineral or clay particulates, with an average size of 10 microns or less, which have a thin hydroxylated surface layer with a positive zeta potential at the pH range set forth therein.

Degen et al U.S. Pat. No. 4,425,238 claims a method for removing acid dyes from recyclable waste water by adding to the water an effective amount of a polymeric cationic assistant made by reacting together an aromatic alkylating agent and a mixture of an aminoalkyl-containing polyelectrolyte with some aluminosilicate, chalk, titanium dioxide, bauxite and/or calcium sulfoaluminate.

Beall U.S. Pat. No. 4,549,966 shows a method for removing from an aqueous composition organic contaminants selected from insoluble organics, aliphatic contaminants, humics and mixtures of the same. The method comprises contacting the contaminated solution with a sufficient amount of an organoclay which was prepared by reacting together a quaternary ammonium salt and a smectite-type clay.

Musselman et al U.S. Pat. No. 4,781,982 shows a method for treating mineral particles such as alumina, bauxite, magnesium, mica, talc, etc., to reduce the adsorption of halide ions and halide-free radicals onto said particles. The method includes surface treating these particles with an alkali metal silicate agent in an aqueous solution having an initial pH of at least 8.5, before neutralizing said solution (to a lower pH), thereby precipitating a silica coating onto said particles.

British Patent No. 1,466,185 shows a method for dewatering aqueous slimes through contact with a solid material having a preferred particle size between 200 microns and 4 mm. Before slime contact, polyelectrolytes are mixed with these particles to cause them to attract clay or reject water at a location sufficiently close to the particles. Such polyelectrolytes do not remain fixedly coated to these large substrate particles. Instead, they leave the surface of these particles and dissolve in a liquid medium for possible recycling.

In British Patent No. 1,512,481, there is claimed a method for removing proteinaceous matter from liquid effluent by adding a flocculant or coagulant to the effluent, then an adsorbent, followed by the addition of a polyelectrolyte. Solid material is then removed from the foregoing mixture through flotation.

British Patent Application No. 2,092,121 shows a process for purifying waste water by: (a) forming floc particles under high shear from a material having a particle size of 10-100 microns, and a high molecular weight polyelectrolyte in the presence of water; then (b) removing suspended solids from the water by treating with these floc particles. According to page 2, lines 43-51, treatment is best effected by passing through a bed of these floc particles.

Canadian Patent No. 1,169,735 claims a process for producing an anionic exchanger by treating cellulose, or a cellulose derivative, with polyethyleneamine in an aqueous reaction medium at a pH between 2 and 6.

West German Patent No. 2,655,356 shows a process for purifying waters containing organics, especially protein and yeast-containing substances. The process includes adding two separate slurries to the water being treated. The first slurry comprises a flocculating agent in the form of a polyelectrolyte, especially polyacrylamide. The second slurry includes an aqueous solution of aluminum oxide and/or silicon dioxide.

West German Patent No. 3,438,140 shows a process for removing heavy metals from waste water by strongly mixing the water under neutral pH conditions with an aqueous sodium aluminate solution in the presence of a polyelectrolyte.

South African Patent No. 7,600,152 claims a method for dewatering colloidally suspended mineral slime and microbial sludge waste, which method includes: adding a fly ash slurry to the waste being treated at a prescribed rate; gently mixing the resulting solution; then adding a polyelectrolyte to this admixture at another prescribed rate followed by more gentle mixing.

SUMMARY OF THE INVENTION

It is a principal object of this invention to provide a dry flocculant composition suitable for use as an aqueous settling agent. It is a further object to provide this flocculant in a powder form which requires no premixing or purposeful liquid dilution before use. It is another object to provide a flocculant suitable for use over a wide range of pH's, from about 3 to about 12. It is still a further object to provide a flocculant powder which is less susceptible to overdosing. It is another object to provide a water purification system which may be modified depending upon the contaminants to be removed. It is a further object to provide waste water clarification means which do not require the presence of a fibrous filter aid material, whether treated or untreated.

It is still another object of this invention to provide a method for flocculating waste water streams which produces a low sludge height and compact volume. It is another object to provide a dry flocculant composition which does not require separate treatment steps for the addition of every component. It is still another object to provide an improved flocculant which outperforms its individual components, especially in terms of settling time and/or removal efficiency. A still further object is to provide a flocculant powder which is less dependent on the amount and type of other solids present in a solution. The flocculation performances of individual polyelectrolytes typically suffer from the aforementioned deficiencies.

Another object of this invention is to provide an inexpensive, yet easy method for producing free-flowing flocculant from a preferred inorganic substrate and cationic or anionic polyelectrolyte. Because this method employs a substantially non-aqueous solvent, it is advisable to produce polyelectrolyte-coated flocculants from such inorganics as aluminum oxide, silicon dioxide, iron oxide, kaolin, bentonite and other clays. It is still a further object to provide a method for removing clay, clay-like materials and/or humic acids from waste water streams. The invention provides means for efficiently removing yeast, biological cells and other cell debris from aqueous solutions substantially through gravity settling. These same removal means may be further aided by filtration and/or centrifugation. It is still another object to provide means for efficiently settling from solution any of the foregoing contaminants.

In accordance with the foregoing objects and advantages, there is disclosed a flocculant powder which comprises an inorganic substrate consisting essentially of metal oxide/hydroxide particles having an average particle size of less than about 30 microns, said substrate having a cationic or anionic polyelectrolyte fixedly coated onto its outer surface, preferably under other than high shear conditions. On a preferred basis, this invention employs activated or unactivated aluminum oxide (alumina) particles as a main substrate. When the contaminants to be removed are themselves quite small, it is preferred to use an activated alumina having an average surface area of about 100 $m^2/g$ or more. When larger contaminant particles are to be removed, adsorbent surface area is less critical and either metal oxide may be coated, or otherwise attached to a cationic polyelectrolyte preferably selected from, but not limited to, a polyamide, polyalkylene polyamine, polyalkylene imine, polyacrylamide, polyacrylate, polyalkylene oxide, polydiallyldialkyl ammonium chloride, and mixtures thereof.

There is further disclosed herein a method for coating or adhering polyelectrolytes to the outermost surface of an inorganic particle. The method includes dispersing a sufficient amount of the polyelectrolyte in a substantially non-aqueous solvent, preferably one having a low boiling point; adding the inorganic particles to the solvent to form a slurry; mixing the slurry preferably under low to moderate shear conditions; and then removing excess solvent from the slurry.

The invention also discloses various methods for treating aqueous solutions containing a colloidal suspension. A first method comprises fixedly coating fine metal oxide/hydroxide particles with a polyelectrolyte capable of settling the suspension; followed by contacting this solution with a sufficient quantity of the coated particles. On a preferred basis, the polyelectrolyte-coated particles of this invention are adapted for adhering (or otherwise remaining attached) to the contaminant/suspension being removed from solution. Specific applications use the preceding method to remove clay, clay-like materials, humic acids, yeast biological cells and other cell debris from waste water streams.

BRIEF DESCRIPTION OF THE DRAWINGS

Further features, other objects and advantages of this invention will become clearer from the following detailed description of the preferred embodiments made with reference to the drawings in which.

DETAILED DESCRIPTION OF THE PREFERRED EMBODIMENTS

In accordance with the present invention, there is disclosed a flocculant powder which comprises: an inorganic substrate consisting essentially of metal oxide/hydroxide particles having an average size of less than about 30 microns. Onto the outer surface portions of these particles, a cationic or anionic polyelectrolyte has been coated, preferably under other than high shear conditions. As used herein, the term "metal oxide/hydroxide" is meant to include a broad spectrum of oxides ranging from those containing only a few hydroxides, such as activated or calcined forms of aluminum oxide (alumina) to more hydrated forms consisting essentially of hydroxides such as $Al(OH)_3$. It is further meant to include other oxygen-containing forms of metal components such as silicates or the like.

It has been found that unactivated forms of alumina provide a suitable substrate for bonding polyelectrolytes to their outer surface portions. For some applications, though, fully or partially dehydrated (or activated) forms are preferred because of their higher surface area. Generally, an activated alumina substrate would be preferred when removing colloids comprised of smaller particles such as clays, clay-like materials and/or humic acids. Unactivated alumina particles may be used when it is less critical to have a high surface area for removing larger colloidal suspensions, such as most biological cells and cell debris.

Metal oxides/hydroxides which may be used as a substrate for this invention include any metal capable of forming an oxide or hydroxide from the following groups in the periodic table: IB, IIA, IIB, IIIA, IIIB, IVA, IVB, VA, VB, VIA, VIB, VIIA, VIIB and VIIIA. The oxides/hydroxides of aluminum, magnesium, titanium, zirconium, iron, silicon, chromium, zinc, vanadium, and mixtures thereof, are especially preferred. A center core of iron oxide/hydroxide may also be used with an outer coating of another metal compound to take advantage of iron's magnetic properties. By use of the term "metal" herein, it should be noted that not only are the traditional metals included, but also, some materials which have been referred to as metalloids, including silicon, selenium, boron, arsenic and tellurium. Oxides/hydroxides from the lanthanide series, as well as oxides/hydroxides of thorium and uranium, may also be used as substrates or support particles according to the invention. The term "metal" is only intended to expressly exclude those elements referred to as non-metals in the periodic table.

While the invention is primarily directed to the use of metal oxides/hydroxide particles as a substrate for polyelectrolyte coatings, it is within the purview of this invention that other metal compounds may also be used. Metal silicates, bauxite, oxalates, phosphates, sulfates, carbonates, apatites, hydrotalcites, zeolites, mica, talc, kaolin, bentonite, clays, chromates and diatomaceous earth, as well as combinations of such materials, or combinations of any such material with a preferred metal oxide/hydroxide, are all alternative substrate candidates.

For purposes of removing smaller colloidal suspensions from solution, it is preferred that the metal oxide/hydroxide substrates be provided in a fine particulate form having substantial density. When used as flocculants according to the invention, particle sizes for these metal oxides/hydroxides may range from as low as 50 angstroms to as large as about 30 microns. A preferred activated alumina substrate consists of particles having an average size of less than about 20 microns, or more preferably about 3-5 microns.

For purposes of this invention, it is preferred that the foregoing fine particulates have a pore volume of about 0.1-2 cm$^3$/g. These particles should also have a relatively high surface area so as to promote the adherence of smaller colloidal particles to their polyelectrolyte-coated outer surfaces. On a preferred basis, activated substrate particles of this invention have an average surface area of about 100 m$^2$/g or more. More preferably, the average surface areas for these particles range from about 150 to 300 m$^2$/g. With respect to purity levels of any substrate particles used hereunder, it should be noted that the level of acceptable impurities depends directly on the end use for said particles. For flocculation purposes, metal oxides/hydroxides should have a purity level of at least about 80%, and preferably about 95% or greater.

Figure 1:
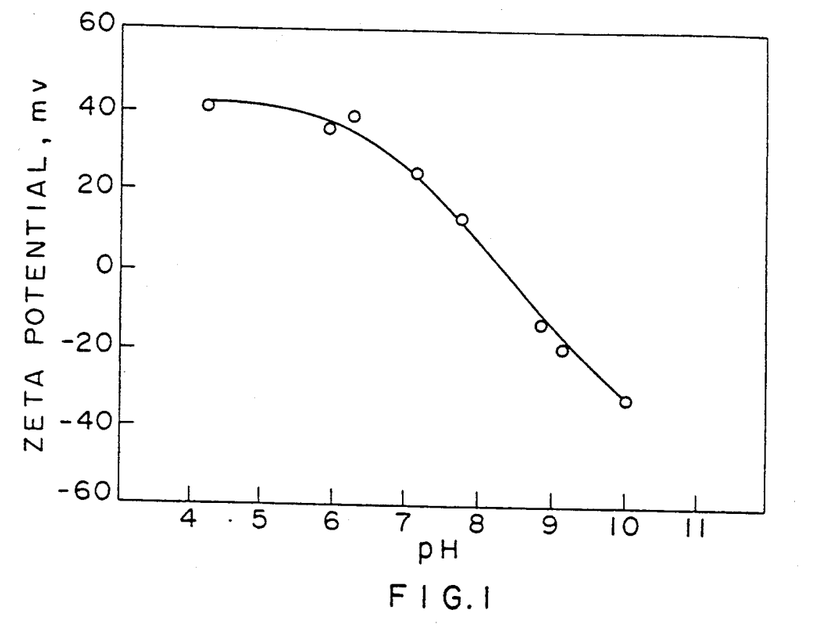
FIG. 1 is a graph showing the measured zeta potential for an uncoated alumina particle as a function of pH.
Figure 2:
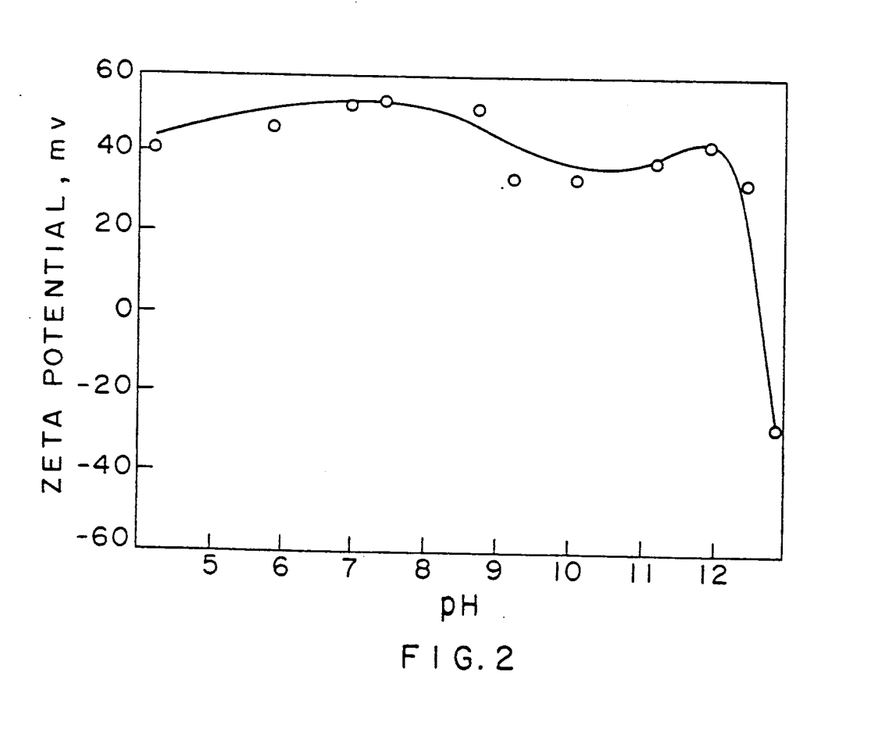
FIG. 2 is a graph showing the measured zeta potential versus pH for one embodiment of polyelectrolyte-coated inorganic substrate according to the invention.

Another important aspect of the substrate particles employed by this invention is its ability to maintain a positive zeta potential over a wide range of pH. The term "zeta potential", as used herein, shall mean the potential across the interface of all liquids and solids, or more specifically, the potential across a diffuse layer of ions surrounding a charged colloidal particle, which is largely responsible for colloidal stability. Zeta potentials are typically calculated from electrophoretic mobilities, i.e., the rates at which colloidal particles travel between charged electrodes placed in solution. Zeta potential analyses serve as a means for estimating the extent to which a particular flocculant may maintain its preferred surface charge for flocculation and/or adsorption purposes. As shown in accompanying FIG. 1, activated alumina particles, prior to being surface modified in the presence of a polyelectrolyte, exhibit a positive zeta potential in a 0.001 normal KNO$_3$ solution up to a pH of about 8.5 or so. This would mean that for waste water solutions having a pH near or above said range, these alumina particles alone would have little ability to flocculate or otherwise adsorb anionic colloidal suspensions in said solutions. After treatment according to the invention, however, zeta potential for the surface modified particles substantially increases as shown in FIG. 2. More particularly, following treatment with a preferred cationic polyelectrolyte, these same particles exhibit a positive zeta potential in the same KNO$_3$ solution to a pH of 12 or more. In addition, it has been observed that the magnitude of positive zeta potential is much higher for a modified alumina than for an unmodified alumina in the pH range between 6.5 and 8.5.

Activated alumina is an especially advantageous substrate particle for purposes of this invention since it exhibits substantially amphoteric properties. Other substrates having the same ability include iron oxide, zirconium oxide, zinc oxide and certain clays. When any substrate according to the invention is amphoteric, or without a significant net positive or negative charge, it has an ability to hold either cationic or anionic polyelectrolytes on its outermost surface. Hence, amphoteric substrate particles exhibit more flexibility depending upon the type, size and charge of colloidal suspension to be removed from an aqueous solution.

By use of the term "polyelectrolyte" herein, it is meant to include any polymer which can be changed into a molecule with a number of electrical charges along its length. Polyelectrolytes may be natural, as in proteins or gum arabics, or synthetic, as in polyethyleneimine, polyacrylic acid salts or the like. Polyelectrolytes may be cationic or anionic depending upon the charges along their lengths. For any given polyelectrolyte, ions having one charge sign are attached to the polymer chain, while those of an opposite sign are free to diffuse into the solution being treated.

In the event that anionic suspensions are to be removed from solution, suitable cationic polyelectrolytes for coating an anionic or amphoteric substrate include a polyamide, polyalkylene polyamine, polyalkyleneimine, polyacrylamide, polyacrylate, polyalkylene oxide, polydiallyldialkyl ammonium chloride and mixtures thereof. Still other suitable cationic polyelectrolytes include polyvinylamines and cross-linking products of ammonia or amines, especially diamines or oligoamines, with 1,2-dichloroethane, epichlorohydrin, dichlorohydrin ether or chlorohydrin ethers of dihydric or polyhydric alcohols. Specific examples of suitable diamines or oligoamines are ethylenediamine, propylenediamine, diethylenetriamine, dipropylenetriamine, triethylenetetraamine, bis-aminopropyl-ethylenediamine, tetraethylenepentaamine, piperazine, aminoethylpiperazine, aminopropylpiperazine, diaminoethylpiperazine and diaminopropylpiperazine. Polyvinylbenzyl quarternary ammonium salts, polyvinylbenzyl tertiary amines, and vinylbenzyl sulfonium polymers may also be coated onto suitable substrates according to the invention. Two specific cationic polyelectrolytes used throughout the examples of this invention consist essentially of a polyethylenepolyamine or a polydiallyldimethyl ammonium chloride. It is to be understood, however, that the invention is not limited to only these specific polyelectrolytes, or to cationic polyelectrolytes per se. Rather, the invention may also be used to coat anionic polyelectrolytes, such as polyacrylic acid, polysulfonic acid and the like, onto a suitable amphoteric or cationic substrate particle.

The preferred method for applying polyelectrolyte coatings to the aforementioned substrate particles commences by dispersing the polyelectrolyte in a substantially non-aqueous solvent, preferably one having a low boiling point. By "substantially non-aqueous", it is meant that the preferred solvent consists essentially of a liquid other than water. It is to be understood, however, that some water may be present in amounts which will not detrimentally affect eventual solvent removal from the slurry of this invention. The method then proceeds by adding a sufficient amount of metal oxide/hydroxide powder (or other inorganic particles) to the solvent to form a slurry; mixing the slurry, preferably under low to moderate shear conditions (or at other than high speeds and/or pressures); and removing solvent from the slurry. Suitable solvents for the foregoing include methanol, ethanol, isopropanol, phenol, acetone, hexane, toluene, ether, chloroform, benzene, carbon tetrachloride, and mixtures thereof. Other suitable solvents may be selected from dioxane, diethyl formamide, dimethyl formamide, dimethyl acetamide, dimethylsulfoxide, tetramethylene sulfine, and a variety of glycol monoethers including ethylene glycol phenyl ether, ethylene glycol methyl ether, ethylene glycol ethyl ether, ethylene glycol n-butyl ether, diethylene glycol methyl ether, diethylene glycol ethyl ether, diethylene glycol n-butyl ether, propylene glycol methyl ether, dipropylene glycol methyl ether and tripropylene glycol methyl ether.

In one of the last steps to the polyelectrolyte-coating process, solvent is removed from the slurry to produce the coated flocculant particles. Depending upon the means by which solvent is removed, there may be further need to pass the dry particles through a sieve or screen so as to break up larger clumps of flocculant. Nevertheless, solvent can be removed from the preceding slurry by one of several means including: spraying the slurry through an orifice so as to produce a powder; heating the slurry at one or more elevated temperatures to enhance solvent evaporation; and/or vacuum drying excess solvent from the slurry.

Figure 3:
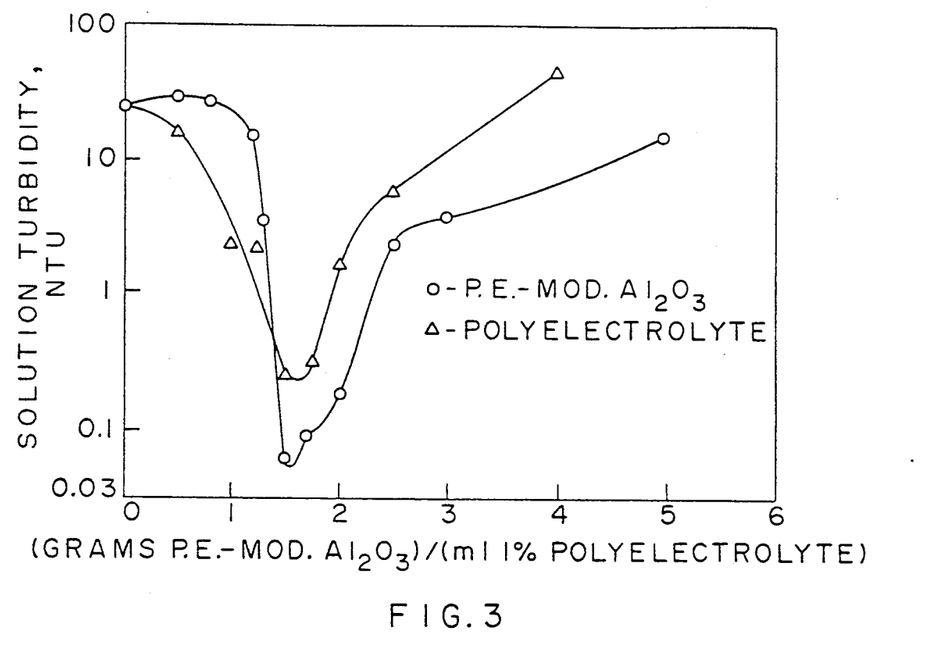
FIG. 3 is a graph showing the measured turbidity for a solution containing a clay-like suspension as a function of the amount of flocculant added to this solution.
Figure 4:
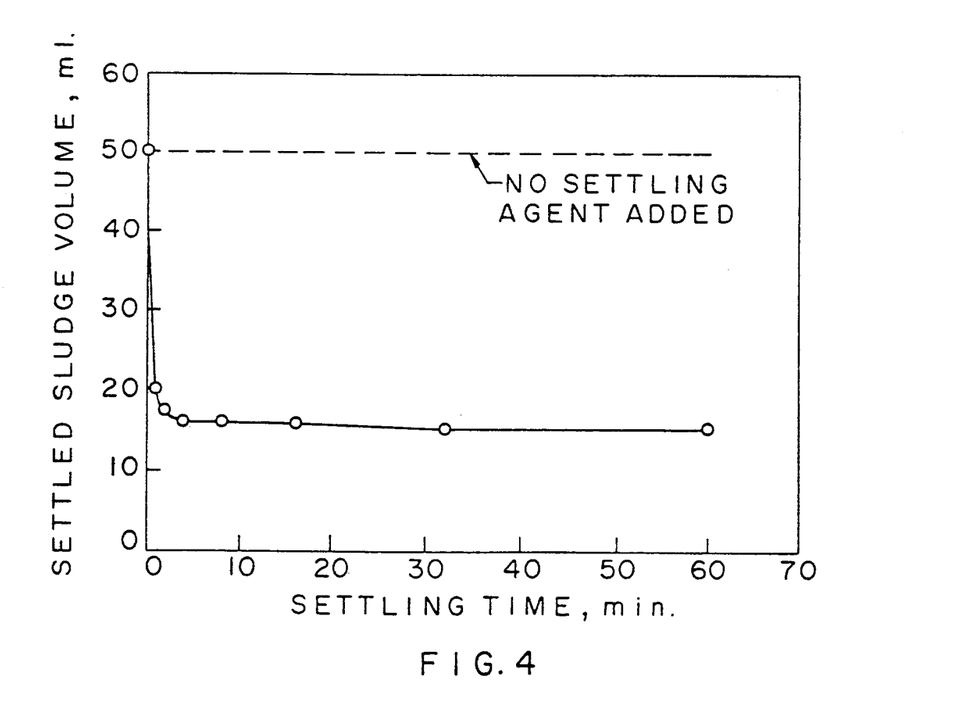
FIG. 4 is a graph showing settled sludge volume as a function of settling time for settling bentonite clay from a solution according to one embodiment of the invention.

The free-flowing powder composition produced by the aforementioned method may be especially used to remove humic acids from waste water substantially by gravity settling. A flocculant from this invention may also be used to remove clay and clay-like materials from waste water streams. Still further flocculants may be used to remove yeast, biological cells and other cell debris from waste water. The extent to which this method removes clay suspensions from a solution is shown in attached FIG. 3. As is shown in this Figure, a polyelectrolyte-modified activated alumina particle (identified as "P.E.-MOD. A1203") outperforms the polyelectrolyte flocculant alone by taking solution turbidity to a much lower Nephelometric Turbidity Unit (NTU) level. The invention also compacts the undesirable colloids to a much lower sludge height of 0.85 cm for the polyelectrolyte modified alumina and of 1.50 cm for the polyelectrolyte alone. The settling effect of bentonite clay, according to the invention, is shown in attached FIG. 4. Particularly, there is shown the rapid effect of clay flocculation through the addition of a polyelectrolyte-modified alumina settling agent.

Figure 5A:
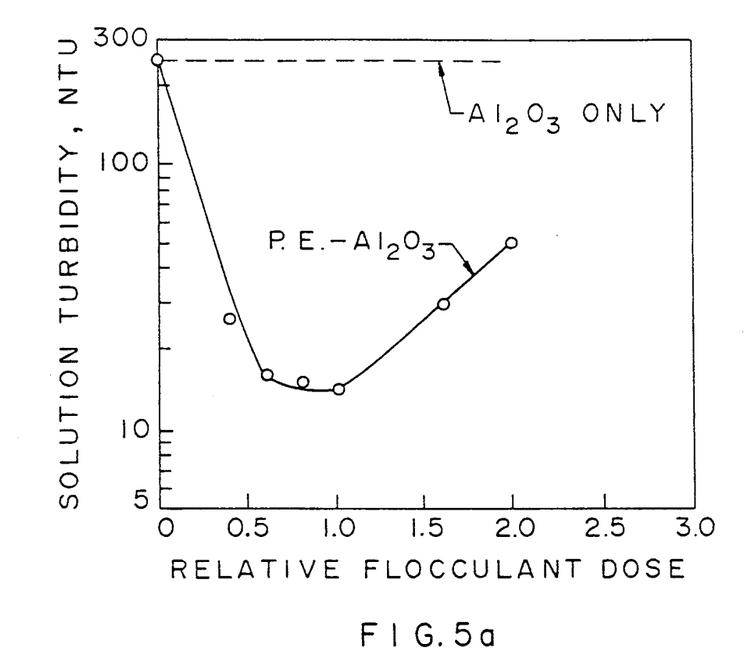
FIG. 5A is a graph showing the turbidity of a yeast-containing solution in a phosphate buffer as a function of relative dose for two comparative flocculants, coated and uncoated aluminas.
Figure 5B:
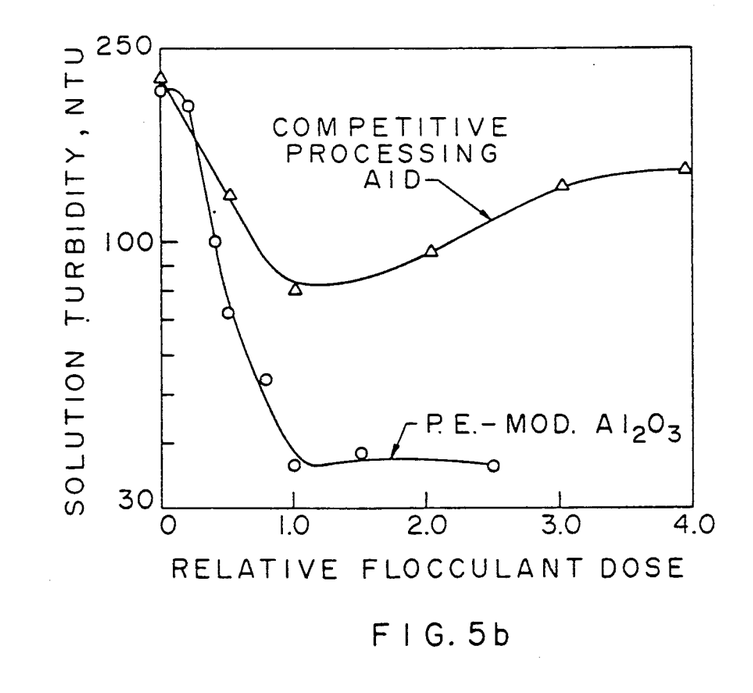
FIG. 5B is a graph showing turbidity of the same yeast solution in a citrate buffer as a function of relative dose for two comparative flocculants.

In accompanying FIGS. 5A and 5B, the solution turbidity (NTU) of a yeast cell suspension is plotted relative to the amount of flocculant added according to the invention. Specifically, FIG. 5A includes an initial concentration of 0.5 g/L of Saccharomyces cerevisiae in a 0.01 molar phosphate buffer having a solution pH of about 6. FIG. 5A shows the extent to which the invention removes yeast from a solution, especially versus the addition of an unmodified alumina particle alone. FIG. 5B shows a comparative removal of the same yeast cell concentration from a 0.01 molar citrate buffer solution (pH = 6) by a polyelectrolyte-modified alumina particle and a competitive processing aid sold by Rohm & Haas of Spring House, Pennsylvania as BIOCRYL TM BPA-1000. For both FIGS. 5A and 5B, the settling test consisted of mixing for 10 minutes and gravity settling for 10 minutes with solution clarity measured by turbidity. From this comparison, it is clear that the flocculant powder of this invention outperforms the above marketed yeast flocculant.

Figure 6:
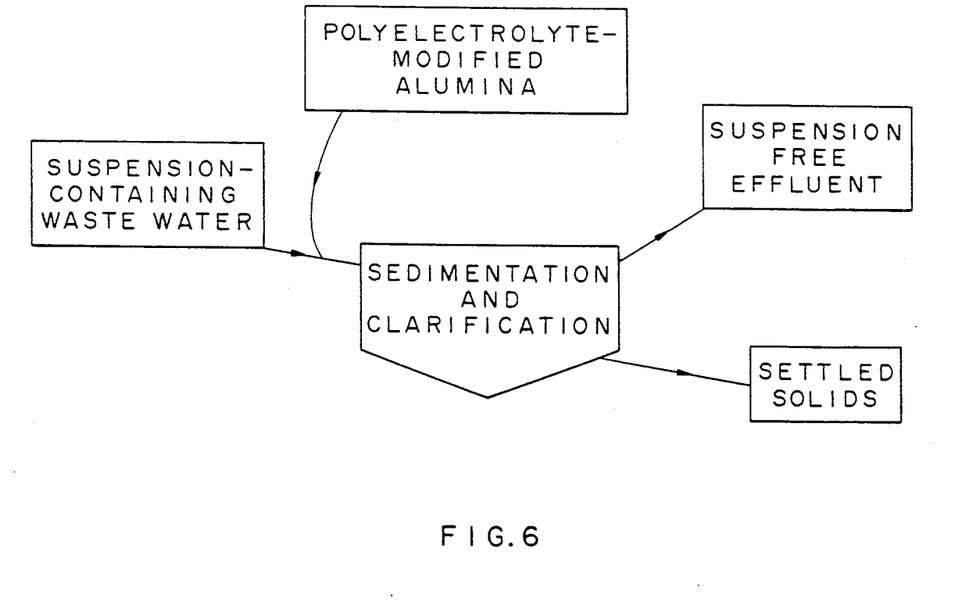
FIG. 6 is a flow sheet illustrating a method for removing colloidal suspensions from a solution according to the invention.

The preceding invention further provides means for removing colloidal suspensions from a waste water solution substantially by gravity settling, said method illustrated schematically in the flow chart at FIG. 6. Particularly, this method includes fixedly coating fine alumina particles with a polyelectrolyte having a charge opposite from that of the suspension to be removed. By the term "fixedly coating", it is meant that the polyelectrolyte applied to a given substrate remains attached (or otherwise adhered) to said substrate, even after being brought into contact with the solution being treated. Because of this "fixed" coating, little to no loose, or unattached, polyelectrolyte remains in solution after treatment, sedimentation and/or clarification. Unlike the prior art, then, the dry flocculant of this invention remains substantially attached to its metal oxide/hydroxide substrate throughout treatment, it being further understood that not all coating systems are perfect such that minor amounts of unattached polyelectrolytes may be found in solution after treatment according to the invention.

The aforementioned polyelectrolyte-modified substrate is then added, in sufficient quantities, to the suspension-containing solution. Within this solution, sedimentation and clarification rapidly occur such that a suspension-free effluent may be removed from the top of a clarification tank. Alternatively, settled solids may be removed from the bottom of the same tank. The present invention provides particularly useful means by which to consolidate sludge to a much denser compact having a lower sludge height and/or surface volume due to the density of the particles acting as substrates for the polyelectrolytes of this invention.

For purposes of experimentation, polyethylene polyamine and polydiallyldimethyl ammonium chloride were surface coated onto activated alumina particles in a methanol-based solvent at various ratios of polyelectrolyte to alumina. The resulting flocculant powders contained from 5 to 20% by weight polyelectrolyte. It was observed that a fine activated alumina particle having about 5 wt.% of polydiallyldimethyl ammonium chloride coated onto the outer portions thereof has the best flocculating characteristics and clarification efficiencies from those observed. At still higher weight percentages of polyelectrolyte coating, the overdosage possibilities for any given flocculant range increase to some extent.

Having described the presently preferred embodiments, it is to be understood that the present invention may be otherwise embodied within the scope of the appended claims.

What is claimed is:

1. A method for reducing the turbidity of an aqueous solution containing colloidal contaminate, said method comprising:
   fixedly coating particles of a metal oxide or hydroxide with a polyelectrolyte capable of settling the contaminants to make a dry flocculant powder thereby, said particles having an average surface area of about 100 $m^2/g$ or more, and an average particle size of less than about 30 microns, wherein the dry powder contains at least about 5% by weight of the polyelectrolyte; and
   contacting the solution with the dry flocculant powder to reduce said turbidity and settle said contaminants out of the solution said polyelectrolyte remaining substantially adhered to the particles during the settling of said contaminants.

2. The method of claim 1 wherein the metal particles are selected from an oxide or hydroxide of: aluminum, magnesium, titanium, zirconium, iron, silicon, chromium, zinc, vanadium, and mixtures thereof, and the polyelectrolyte is selected from: a polyamide, polyalkylene polyamine, polyalkylene imine, polyacrylamide, polyacrylate, polyalkylene oxide, polydiallyldialkyl ammonium chloride, and mixtures thereof.

3. The method of claim 1 wherein the contaminants are selected from clay, humic acids and mixtures thereof.

4. The method of claim 1 wherein the contaminants include biological cells and cell debris.

5. The method of claim 1 wherein the dry flocculant powder contains about 5-20% by weight of the polyelectrolyte.

6. A method for removing colloidal suspensions from an aqueous solution substantially by gravity settling, said method comprising:
   adding to the solution a sufficient quantity of dry powder comprising activated or unactivated aluminum oxide particles onto which have been coated a polyelectrolyte having a charge opposite from that of the suspensions to be removed, said particles having an average particle size of less than about 30 microns, wherein the dry powder contains at least about 5% by weight of the polyelectrolyte, and said polyelectrolyte remaining substantially adhered to the particles during removal of the colloidal suspensions from the solution.

7. The method of claim 6 wherein the dry powder contains about 5-20% by weight of the polyelectrolyte.

8. The method of claim 6 wherein the polyelectrolyte is selected from a polyamide, polyalkylene polyamine, polyalkylene imine, polyacrylamide, polyacrylate, polyalkylene oxide, polydiallyldialkyl ammonium chloride, and mixtures thereof.

9. A method for removing humic acids from waste water which comprises:
   contacting the water with dry particles of a metal oxide or metal hydroxide onto which have been fixedly coated a cationic or anionic polyelectrolyte, said particles having an average particle size less than about 30 microns, wherein the dry particles contain at least about 5% by weight of the polyelectrolyte, said polyelectrolyte remaining substantially adhered to the particles during removal of said humic acids form said waste water.

10. The method of claim 9 wherein the dry particles include an activated aluminum oxide having an average surface area of about 100 $m^2/g$ or more.

11. The method of claim 9 wherein the dry particles contain about 5-20% by weight of the polyelectrolyte.

12. The method of claim 9 wherein the polyelectrolyte is selected from a polyamide, polyalkylene polyamine, polyalkylene imine, polyacrylamide, polyacrylate, polyalkylene oxide, polydiallyldialkyl ammonium chloride, and mixtures thereof.

13. A method for removing clay from waste water which comprises:
   containing the water with dry particles of a metal oxide or metal hydroxide onto which have been fixedly coated a cationic or anionic polyelectrolyte, said particles having an average particle size less than about 30 microns, wherein the dry particles contain at least about 5% by weight of the polyelectrolyte, said polyelectrolyte remaining adhered to the particles during removal of said clay from said waste water.

14. The method of claim 13 wherein the dry particles include an activated aluminum oxide having an average surface area of about 100 $m^2/g$ or more.

15. The method of claim 13 wherein the dry particles contain about 5-20% by weight of the polyelectrolyte.

16. The method of claim 13 wherein the polyelectrolyte is selected from a polyamide, polyalkylene polyamine, polyalkylene imine, polyacrylamide, polyacrylate, polyalkylene oxide, polydiallyldialkyl ammonium chloride, and mixtures thereof.

17. A method for removing biological cells and cell debris from waste water which comprises:
   contacting the water with dry particles of a metal oxide or metal hydroxide onto which have been fixedly coated a cationic or anionic polyelectrolyte, said particles having an average particle size less than about 30 microns, wherein the dry particles contain at least about 5% by weight of the polyelectrolyte, said polyelectrolyte remaining substantially adhered to the particles during removal of said biological cells and cell debris from said waste water.

18. The method of claim 17 wherein the dry particles include an activated aluminum oxide having an average surface area of about 100 $m^2/g$ or more.

19. The method of claim 17 wherein the dry particles contain about 5-20% by weight of the polyelectrolyte.

20. The method of claim 17 wherein the polyelectrolyte is selected from a polyamide, polyalkylene polyamine, polyalkylene imine, polyacrylamide, polyacrylate, polyalkylene oxide, polydiallyldialkyl ammonium chloride, and mixtures thereof.

21. A method for removing colloidal suspensions from an aqueous solution substantially by gravity settling, said method comprising:
   adding to the solution a sufficient quantity of dry powder comprising particles of a metal oxide or metal hydroxide onto which have been coated a polyelectrolyte having a charge opposite from that of the suspensions to be removed, wherein said particles have an average particle size of less than about 30 microns, and the dry powder contains at least about 5% by weight of the polyelectrolyte said polyelectrolyte remaining substantially adhered to the particles upon removal of the colloidal suspensions from the solution.

22. The method of claim 21 wherein the particles contain about 5-20% by weight of the polyelectrolyte.

23. The method of claim 21 wherein the polyelectrolyte is selected from a polyamide, polyalkylene polyamine, polyalkylene imine, polyacrylamide, polyacrylate, polyalkylene oxide, polydiallyldialkyl ammonium chloride, and mixtures thereof.

24. The method of claim 21 wherein the particles include an activated aluminum oxide having an average surface area of about 100 $m^2/g$ or more.

* * * * *